(12) United States Patent
Lim et al.

(10) Patent No.: US 9,304,208 B2
(45) Date of Patent: Apr. 5, 2016

(54) MOBILE TERMINAL AND GPS ENGINE CONTROL METHOD THEREOF

(71) Applicant: LG ELECTRONICS INC., Seoul (KR)

(72) Inventors: Hyebong Lim, Seoul (KR); Kwanghun Choi, Seoul (KR); Youngseok Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 490 days.

(21) Appl. No.: 13/900,996

(22) Filed: May 23, 2013

(65) Prior Publication Data

US 2013/0314278 A1 Nov. 28, 2013

(30) Foreign Application Priority Data

May 24, 2012 (KR) ......................... 10-2012-0055653

(51) Int. Cl.
 *G01S 19/34* (2010.01)
(52) U.S. Cl.
 CPC ....................................... *G01S 19/34* (2013.01)
(58) Field of Classification Search
 CPC ........... G01S 19/34; G01S 19/26; G01S 1/00; G01S 19/05; H04W 52/02; G08B 1/08
 USPC ....................................... 342/357.74, 357.65
 See application file for complete search history.

(56) References Cited

U.S. PATENT DOCUMENTS

| 6,314,308 | B1 | 11/2001 | Sheynblat et al. | |
|---|---|---|---|---|
| 2007/0241888 | A1 | 10/2007 | Mantovani et al. | |
| 2007/0293215 | A1* | 12/2007 | Dawson | H04W 76/022 455/433 |
| 2011/0053606 | A1* | 3/2011 | Yao | H04W 4/02 455/456.1 |
| 2011/0136472 | A1* | 6/2011 | Rector | H04M 1/72572 455/411 |
| 2012/0113029 | A1* | 5/2012 | Ye | G06F 3/041 345/173 |
| 2012/0122493 | A1 | 5/2012 | Yato | |
| 2012/0185599 | A1* | 7/2012 | Chien | H04L 63/107 709/227 |
| 2013/0173947 | A1* | 7/2013 | Nomura | G01R 31/3613 713/340 |
| 2013/0210408 | A1* | 8/2013 | Hohteri | G06F 1/3231 455/418 |
| 2013/0238700 | A1* | 9/2013 | Papakipos | G06F 21/81 709/204 |

FOREIGN PATENT DOCUMENTS

CN 101207894 A * 6/2008
EP 2 453 262 A2 5/2012

* cited by examiner

*Primary Examiner* — Harry Liu
(74) *Attorney, Agent, or Firm* — Birch, Stewart, Kolasch & Birch, LLP

(57) ABSTRACT

A method of controlling a mobile terminal, and which includes turning on, via a controller of the mobile terminal, a global positioning system (GPS) engine to measure a position of the mobile terminal and provide a position-related service using the position measured by the GPS engine; sensing, via a sensor of the mobile terminal, a movement characteristic of the mobile terminal; temporarily turning off the GPS engine when the sensed movement characteristic of the mobile terminal is below a predetermined threshold; and turning back on the GPS engine when then sense movement characteristic is greater than or equal to the predetermined threshold.

18 Claims, 9 Drawing Sheets

MOBILE TERMINAL AND GPS ENGINE CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2012-0055653, filed on May 24, 2012, the contents of which is incorporated by reference herein in its entirety.

BACKGROUND OF THE INVENTION

1. Field of the Invention

This present invention relates to a mobile terminal that minimizes current consumption by a GPS engine upon use of position information, and a GPS engine control method thereof.

2. Background of the Invention

Mobile terminals (or electronic devices) can perform various functions, for example, data and voice communication, capturing images or video, storing voice, reproducing music files via a speaker system, displaying images or video and the like. Some of mobile terminals may include an additional function of playing games, and other mobile terminals may be implemented as multimedia players. In addition, mobile terminals can receive broadcast or multicast signals allowing the user to view video or television programs.

With release of smart phones with a large screen, mobile terminals have recently been developed as various entertainment equipment beyond a simple call function. In addition, the time spent using the mobile terminals has increased. As one example, the mobile terminal provides a position-related function. The position-related function may be useful for controlling execution of the aforementioned functions (e.g., a camera function or a display function) and operations of various types of applications as well as a function of notifying a current position (location) to a user (location search function or a location alarm function).

For example, the mobile terminal can measure the user's position information so as to provide a navigation function, or other functions such as augmented reality, route search (e.g., restaurant search), map search and the like. To provide the position-related function, a position is measured using a GPS engine. In particular, the GPS engine is turned on in response to a request for a position measurement and turned off in response to completion of the position measurement. The GPS engine is turned on/off depending on user' one-time request for position information. That is, when position information has to be continuously provided for a preset time, for example, in a navigation system, the GPS engine has to remain in the On state for the preset time.

However, the mobile terminal continuously provides the position information, even when a user is pausing for a preset time during movement or moving perpendicularly (for example, going up in an elevator). That is, the GPS engine measures the position information while being kept turned on. This causes unnecessary power consumption (or current consumption).

Accordingly, the current consumption has become a great issue from the perspective of a device manufacturer or the user. To solve the problem, a battery capacity is also increasing. However, the increase in the battery capacity has a limit in terms of a size of a mobile terminal or a fabricating cost. Therefore, various methods are required to reduce current consumption while executing a function of providing position information.

SUMMARY OF THE INVENTION

Therefore, an aspect of the detailed description is to provide a mobile terminal capable of minimizing current consumption by controlling ON/OFF of a GPS engine in response to user movement upon use of position information, and a GPS engine control method thereof.

To achieve these and other advantages and in accordance with the purpose of this specification, as embodied and broadly described herein, there is provided a global positioning system (GPS) engine control method for a mobile terminal including providing a continuous position-related service using position information measured by a GPS engine, sensing movement of the mobile terminal, and providing a selective position-related service by controlling the GPS engine to be turned on/off in response to the sensed movement of the mobile terminal.

The position-related service may refer to a service using the position measured by the GPS engine in a continuous or periodic manner. The position-related service may include applications using map information, such as navigation and route search, and a position report function using a secure user plane location (SUPL) function.

The providing of the continuous position-related service may include executing position measurement using the GPS engine according to a preset trigger type, checking whether or not the measured position satisfies a trigger condition, and executing a position report to a network server according to a preset report period when the measured position satisfies the trigger condition.

The providing of the selective position-related service may be executed to provide the position-related service using previously measured position information after temporarily turning the GPS engine off when the mobile terminal is paused for a threshold time or moved within a threshold distance.

The threshold time and the threshold distance may be set according to a user selection or automatically set according to a type of service or application.

The movement of the mobile terminal may be sensed when a power-saving mode is in an enabled state. The movement of the mobile terminal may be sensed by using at least one of speed, rotation, azimuth and gravity with respect to the mobile terminal.

The movement of the mobile terminal may refer to a movement in a right and left direction, and a movement thereof in an up and down direction may be regarded as a paused state.

The power-saving mode may be automatically set to an enabled state when a battery level is less than a predetermined level.

The position-related service may be provided using newly measured position information after turning the GPS engine on when the mobile terminal is moved within the threshold time or over the threshold distance.

To achieve these and other advantages and in accordance with the purpose of this specification, as embodied and broadly described herein, there is provided a mobile terminal including a global positioning system (GPS) engine to measure position information by receiving a GPS signal, a sensor to sense movement of the mobile terminal, and a controller to provide a continuous position-related service using the position information measured by the GPS engine, and a selective position-related service by turning the GPS engine on/off according to the movement of the mobile terminal when the movement of the mobile terminal is sensed by the sensor.

The controller may temporarily turn the GPS engine off and provide the position-related service using previously measured position information when the movement of the mobile terminal is not sensed for a threshold time or is sensed within a threshold distance.

The threshold time and the threshold distance may be set according to a user selection or automatically set according to a type of service or application.

The sensor may include at least one of a gyroscopic sensor, a geo-magnetic sensor, a digital compass and a G-sensor.

The controller may sense a right and left movement of the mobile terminal when a power-saving mode is in an enabled state, and especially regard an up and down movement thereof as a paused state, when a power-saving mode is in an enabled state.

The controller may check whether the power-saving mode has been selected by a user or set to the enabled state according to a type of service using position information.

The controller may automatically enable a power-saving sensor position report function when a battery level is less than a predetermined level.

The controller may provide the position-related service using newly measured position information after turning the GPS engine on when the movement of the mobile terminal is sensed within the threshold time or over the threshold distance.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings.

DETAILED DESCRIPTION OF THE INVENTION

Description will now be given in detail of preferred configurations of mobile terminals according to the present invention, with reference to the accompanying drawings. Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together.

Mobile terminals may be implemented using a variety of different types of terminals. Examples of such terminals include mobile terminals, such as mobile phones, smart phones, notebook computers, digital broadcast terminals, Personal Digital Assistants (PDA), Portable Multimedia Players (PMP), navigators and the like, and stationary terminals, such as digital TVs, desktop computers and the like. The following description assumes that the terminal is a mobile terminal. However, it can be easily understood by those skilled in the art that the configuration according to the following description can be applied to the stationary terminals except for components particularly provided for mobility.

Figure 1:
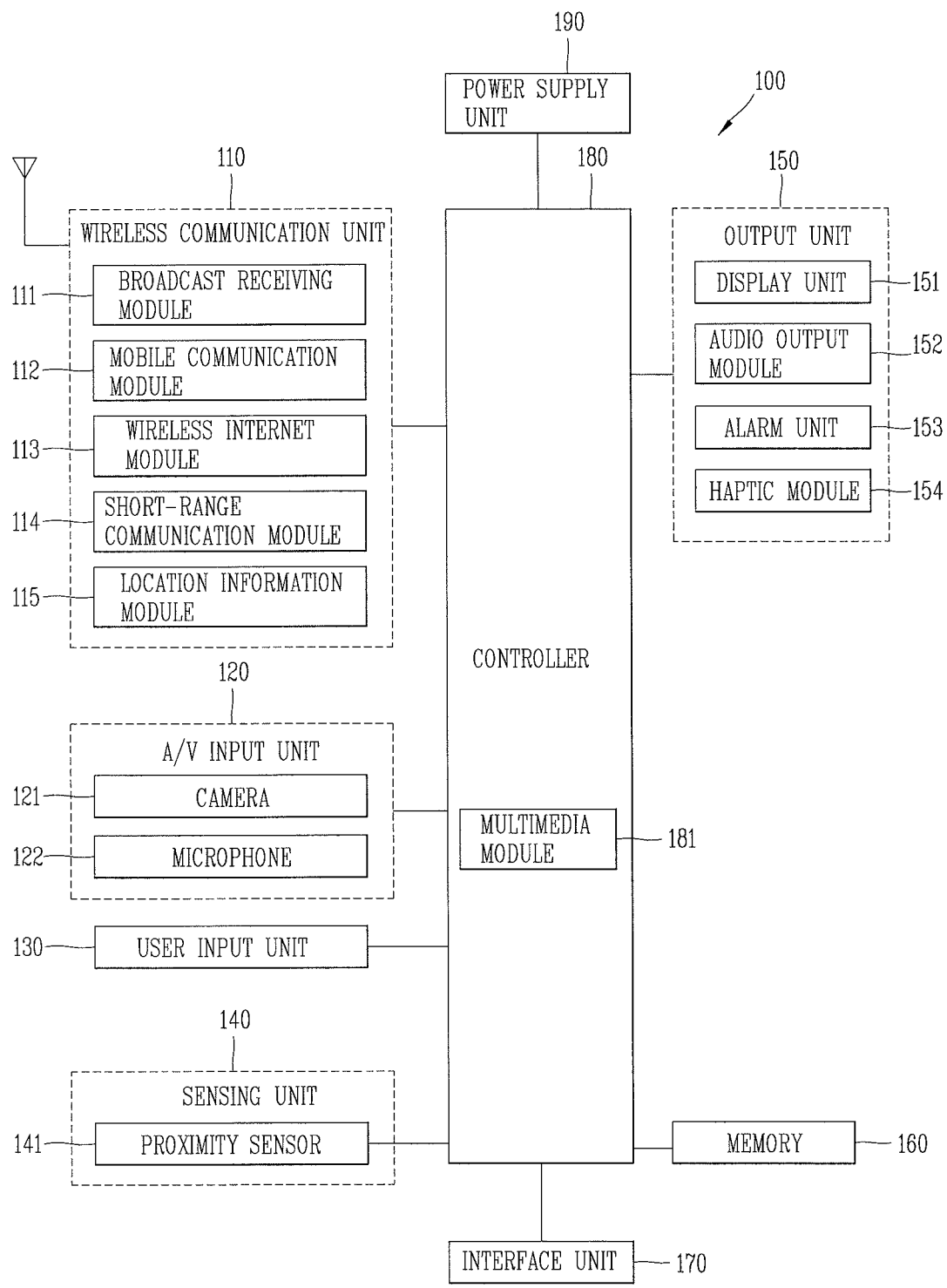
FIG. 1 is a block diagram of a mobile terminal in accordance with one embodiment.

FIG. 1 is a block diagram of a mobile terminal in accordance with one embodiment of the present invention.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel. Examples of broadcast associated information may include information associated with a broadcast channel, a broadcast program, a broadcast service provider, and the like. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal. Examples of such wireless Internet access may include Wireless LAN (WLAN), Wi-Fi, Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, Near Field Communication (NFC) and the like. Short-range communication related modules for user account, in addition to those short-range communication modules, may employ a method proposed in the present disclosure.

The position location module 115 denotes a module for detecting or calculating a position of a mobile terminal. An example of the position location module 115 may include a Global Position System (GPS) module. Under the current technique, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Also, the GPS module may continuously calculate a current position in real time so as to obtain speed information.

The A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal via a microphone while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with the display 151 to be explained later so as to be in cooperation with the display 151, which is referred to as a touch screen.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device, and the like. Here, the sensing unit 140 may include a proximity sensor 141, which will be described later in relation to a touch screen.

The sensing unit 140 includes a geomagnetic sensor to calculate a moving direction when a user moves, a gyro sensor to calculate a rotating direction, and an acceleration sensor.

The interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port. Such interface unit 170 may receive data from an external device, or provided with power and accordingly transfer the received data or power to each component within the mobile terminal 100 or transfer data of the mobile terminal 100 to an external device.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The output unit 150 is configured to output an audio signal, a video signal or an alarm signal. The output unit 150 may include a display 151, an audio output module 152, an alarm 153, and the like.

The display 151 may output information processed in the mobile terminal 100. For example, when the mobile terminal is operating in a phone call mode, the display 151 will provide a User Interface (UI) or a Graphic User Interface (GUI) which includes information associated with the call.

Meanwhile, as mentioned above, a touch screen can be configured as the display 151 and the touchpad are layered with each other to work in cooperation with each other. This configuration permits the display 151 to function both as an input device and as an output device. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like. Some of the displays can be configured to be transparent such that it is possible to see the exterior therethrough. These displays may be called transparent displays. A representative example of the transparent display may include a Transparent Organic Light Emitting Diode (TOLED), and the like. The mobile terminal 100 may include two or more of such displays 151 according to its embodiment. For example, the mobile terminal 100 may simultaneously include an external display (not shown) and an internal display (not shown). The touch screen may be configured so as to detect a touch input pressure as well as touch input position and touch input area.

The audio output module 152 may output audio data which is received from the wireless communication unit 110 in various modes including call-receiving mode, call-placing mode, recording mode, voice recognition mode, broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. When a call signal or a message is received, the alarm unit 153 may output vibration to make a user recognize the event occurrence. Of course, the signal for notifying the event occurrence may be output through the display unit 151 or the audio output module 152.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The mobile terminal 100 shown in FIG. 1 may be configured to operate within a communication system which transmits data via frames or packets, including both wireless and wireline communication systems, and satellite-based communication systems.

Figure 2:
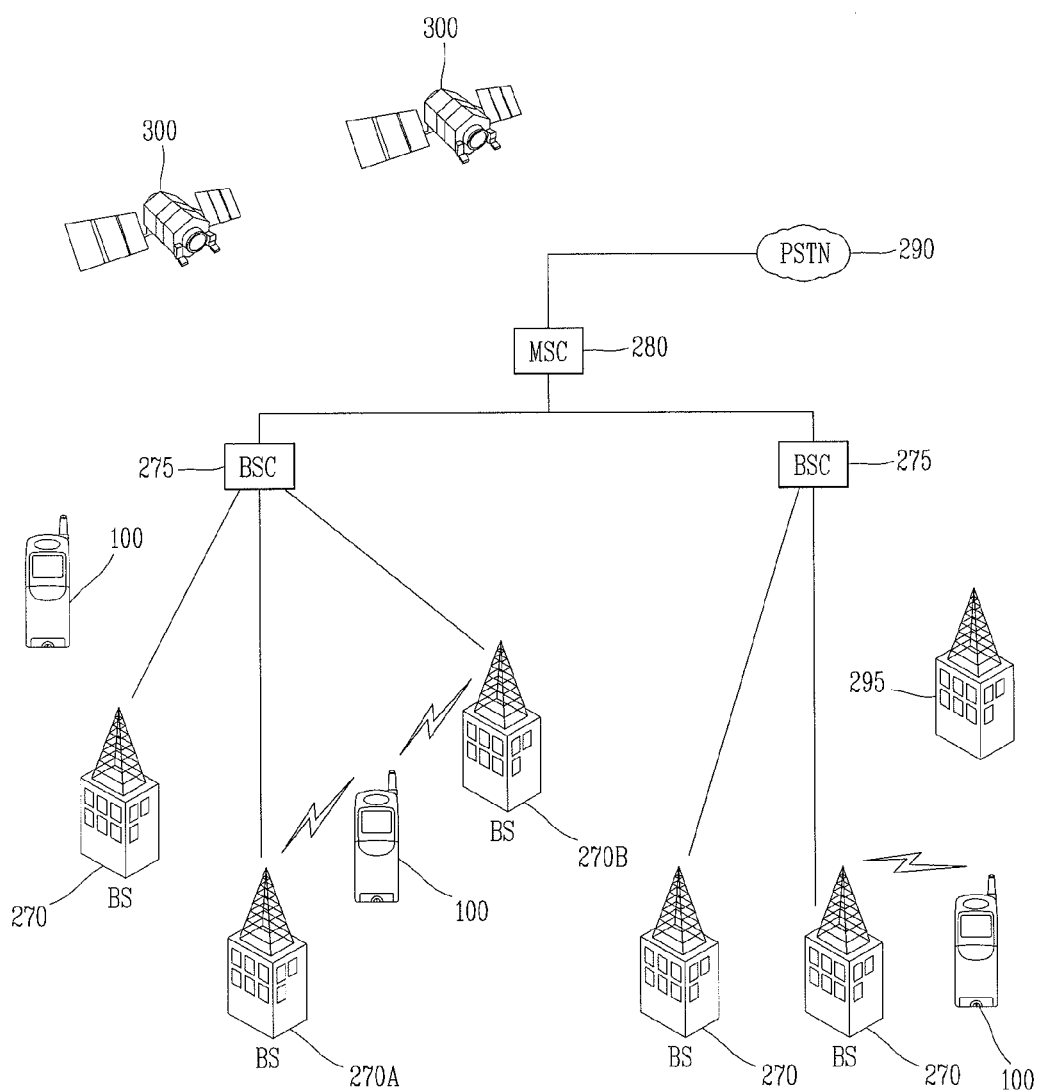
FIG. 2 is a block diagram of a wireless communication system which is operable with the mobile terminal in accordance with the one embodiment.

FIG. 2 shows a wireless communication system which is operable with the mobile terminal in accordance with the one embodiment.

As shown in FIG. 2, a wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2, transmits a broadcast signal to the mobile terminals 100 operating within the system. The broadcast receiving module 111 (FIG. 1) is typically configured inside the mobile terminal 100 to receive broadcast signals transmitted by the BT 295.

FIG. 2 further depicts several Global Positioning System (GPS) satellites 300. Such satellites 300 facilitate locating the position of at least one of plural mobile terminals 100. Two satellites are depicted in FIG. 2, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

To support a position trigger-based service, even when a user is located at the same position as a previous position because the user is pausing, the mobile terminal always reports different positions with an error, which is caused due to a fundamental position error of a GPS system, to a network server.

Also, while the user executes an application, such as a navigator, which continuously uses position information, even when the user is pausing at the same position as the previous position, the controller 180 always reports to a network server a position with an error due to a fundamental position error of the GPS system.

For a position trigger-based service or a service (or application) such as navigation system, which continuously uses position information, the GPS engine has to be always maintained in an operating state (ON state). This may causes an increase in current consumption.

The present disclosure provides various methods for reducing current consumption by controlling a GPS engine to be turned on/off according to movement of a mobile terminal upon providing a position-related service using the mobile terminal.

The movement indicates that the user moves within a threshold time or moves more than a threshold distance.

The position-related service is a service using a GPS engine, especially, may include every service and application, which use position information continuously or periodically, by turning the GPS engine on for a preset time. The (position-related) service using the GPS engine may provide a navigation function, or include augmented reality, route search (for example, search for restaurant) and a position report function using a secure user plane location (SUPL) function.

The user's movement may include at least one of speed, rotation, azimuth and gravity. The movement may be sensed by using at least one sensor mounted in the mobile terminal. The at least one sensor may include a gyroscopic sensor for sensing speed and rotation of the mobile terminal, a geo-magnetic sensor and a digital compass for sensing an azimuth of the mobile terminal using a magnetic field of the Earth, and a G-sensor for estimating movement by sensing to which direction the gravity is applied.

Figure 3:
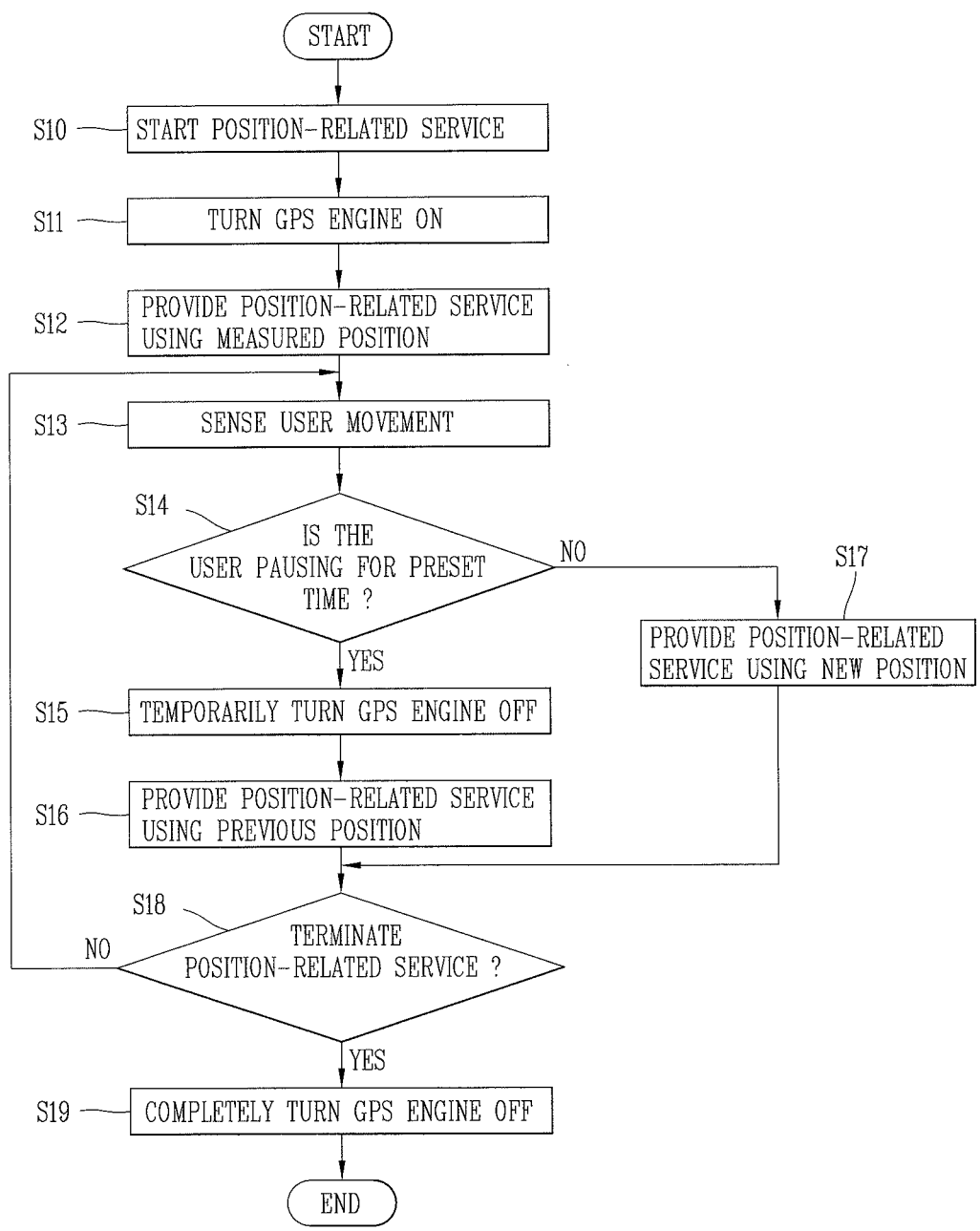
FIG. 3 is a flowchart showing a first embodiment of a GPS engine control method upon use of position information in accordance with the present disclosure.

Next, FIG. 3 is a flowchart showing a first embodiment of a GPS engine control method using position information. In particular, when a user initiates a position-related service (for example, a navigation function) which continuously uses position information, the controller 180 turns on a GPS engine and calculates the user's current position using a GPS signal received through the GPS engine (S10 and S11).

Upon calculation of the current position, the controller 180 checks settings of a power-saving mode. In an enabled state of the power-saving mode, the controller 180 can provide the navigation function on the display unit 151 using the measured position, and simultaneously sense the user's movement using a sensor to determine whether or not the user is pausing for a preset time or moving upwards/downwards in an elevator, for example (S12~S14).

Figure 4:
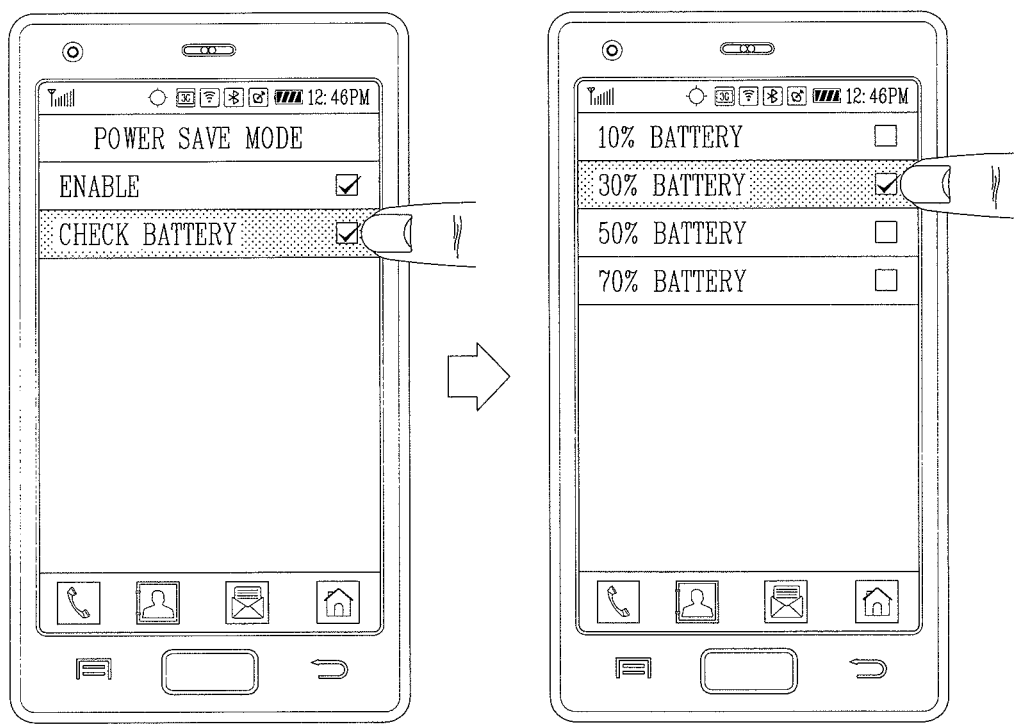
FIG. 4 is a view showing exemplary settings of a power-saving mode in a position-related service.

In more detail, FIG. 4 is a view showing settings of a power-saving mode in a position-related service. As shown in FIG. 4, in a setting menu of the navigation function, the user can set a power-saving mode by selecting an ENABLE item. A user may also select a distance or time setting item to set at least one of a threshold distance and a threshold time for checking the user movement. The user can also set the power-saving mode to be automatically enabled when a battery level is less than a predetermined level.

Also, the functions in the present invention can also be operated even without a user selection in order to the reduce power consumption in the position-related service. While providing the navigation function, and the controller 180 determines the user is pausing for the preset time (threshold time), or moves within a preset distance (threshold distance), which is within a GPS error range, in consideration of a GPS performance, or moves perpendicularly (for example, in an elevator) (Yes in S14), the controller 180 temporarily turns off the GPS engine (S15), and continuously provide the navigation function using a previous position pre-stored in the memory 160 (S16).

Here, when another function other than the navigation function is executed, the controller 180 can turn off or pause an LCD and a task (map download) with a network as well as the GPS engine so as to further reduce current consumption. On the contrary, if the controller 180 determines the user keeps moving or has moved more than a threshold distance, which is used as a reference which the GPS engine was temporarily turned off based on (No in S14), the controller 180 can turn the GPS engine on when it is turned off, measure a new position using the GPS engine, and continuously provide the navigation function using the measured new position (S17).

Afterwards, when the user terminates the position-related service, namely, the navigation function is stopped (Yes in S18), the controller 180 can completely turn the GPS engine off and all the processes may be completed. When the navigation function has not been stopped yet (No in S18), the controller returns to step S13. Further, when the user movement is sensed, the controller 180 may execute the step S17 after turning the GPS engine on.

Figure 9:
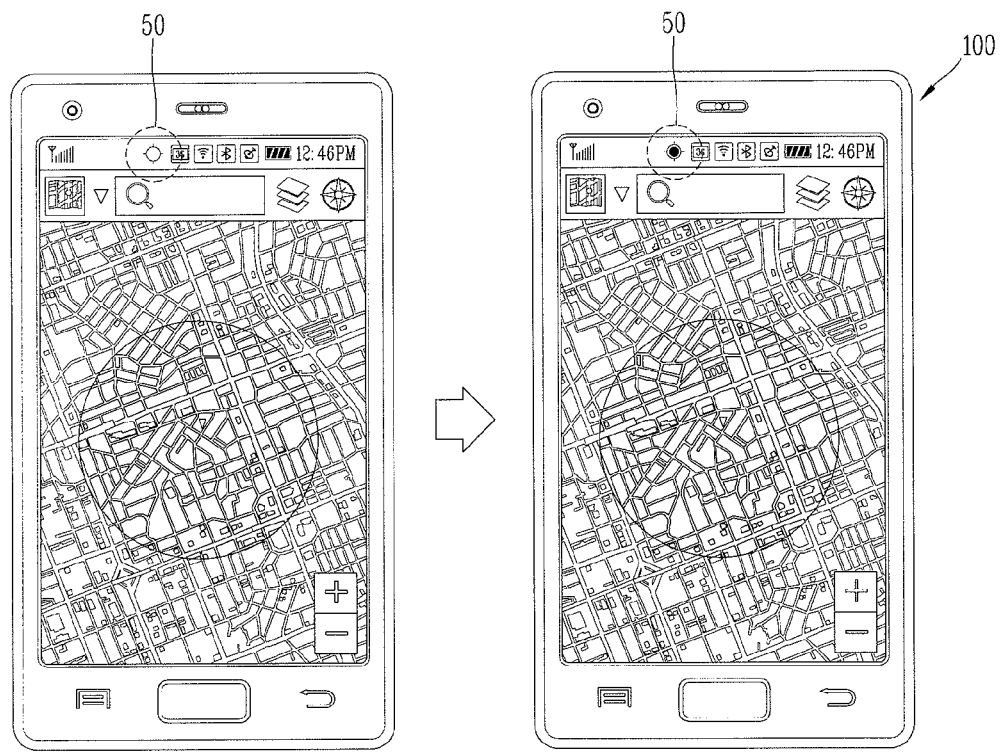
FIG. 9 is an exemplary view showing a state of a GPS icon when the GPS engine is turned on/off.

In this step, when the GPS engine is temporarily turned off, as shown in FIG. 9, a GPS icon 50 displayed on a screen (an indication area) may change into a state, which notifies that the GPS engine has been turned off, or temporarily disappear. Thus, while providing a user with a service which continuously uses position information, a GPS engine may be temporarily turned off when the user pauses or moves within a threshold distance, and turned on again to provide the service when the user movement is sensed, thereby effectively reducing current consumption by the GPS engine.

Hereinafter, a description will be given of an example that the GPS engine control method of the mobile terminal is applied to a secure user plane location (SUPL) function. In particular, a secure user plane location (SUPL) function refers to a position information service function, which measures a position of a mobile terminal through a GPS engine using standardized positioning technologies and reports the measured position to a network (e.g., network server) when the measured position meets a predetermined trigger condition specified in trigger information, for example, meets an event-based trigger reference (condition) or a periodic trigger reference.

The SUPL function refers to a position trigger function, and may include an area-based trigger function and a periodic trigger function. The area-based trigger function refers to a method of reporting a position by recognizing an occurrence of an event when a user enters or moves out of a predetermined area, and the periodic trigger function refers to a method of periodically reporting a measured position per every preset time.

Further, the mobile terminal may initiate positioning. When the current position belongs to an area which is specified in area event information, namely, when an area event occurs, the mobile terminal can report its measured position, namely, the area event. Here, the occurrence of the area event indicates that the trigger condition has been satisfied, and a term referring to when it has been confirmed that the terminal enters or moves out of a predetermined area or exists within the area. Also, the area, which is a term matching "predetermined area" disclosed herein, indicates information defining an area event.

Figure 5A:
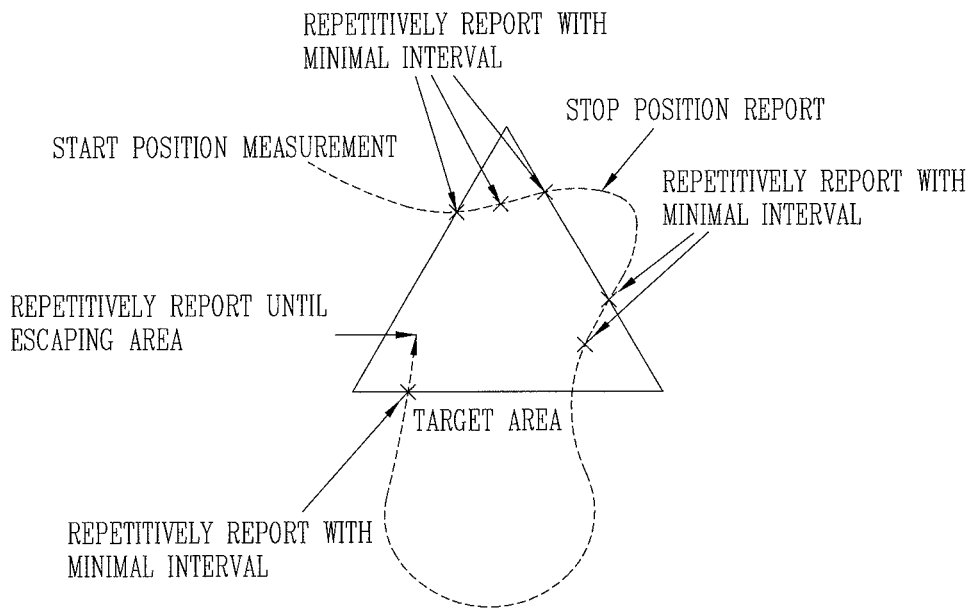
FIGS. 5A and 5B are conceptual views showing an execution of a position report according to an area-based trigger function according to the related art.
Figure 5B:
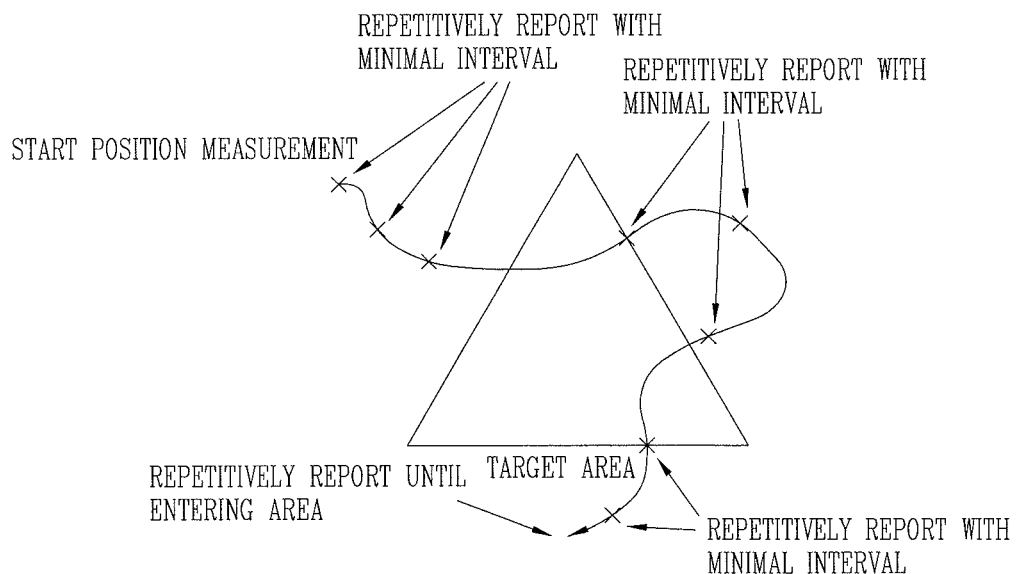

In more detail, FIGS. 5A and 5B are conceptual views showing an execution of a position report according to an area-based trigger function according to the related art. FIG. 5A shows an example of executing a position report when the user enters a target area.

As shown in FIG. 5A, when a position measurement is initiated, the controller 180 enables the position location module 115 (hereinafter, referred to as 'GPS engine'), and calculates a current position (value) of the mobile terminal using a GPS signal input through the GPS engine. Once the position is calculated, in order to check whether or not a trigger condition has been satisfied, the controller 180 compares the calculated position with a position of a preset target area.

The target area indicates a position set by at least one cell ID which is previously stored. According to the comparison result, when the trigger condition has not been satisfied, the controller 180 calculates a new position value and then compares the newly calculated position with the position of the target area to recheck whether or not the trigger condition is satisfied (checking whether or not an area event has occurred).

Afterwards, when the measured position is equal to the position of the target area (i.e., equal to at least one ID) as the user enters the target area, the controller 180 continuously measures the position within the target area using the GPS engine. Then, the controller 180 reports the continuously measured position to the network server according to a preset report pattern (period or time). Here, the report pattern may be set to a minimal interval. When the user has moved over the target area, the area event does not occur. Therefore, the controller 180 does not execute the position report any more.

Next, FIG. 5B shows an example of executing a position report in a repetitive manner when the user moves out of a target area. In particular, FIG. 5B shows an example that an area-based trigger type is set to "executing the position report when the user moves out of the target area." Therefore, the operation is executed opposite to the example shown in FIG. 5A in which the area-based trigger type is set to "executing the position report when the user enters the target area."

That is, in FIG. 5B, when the user moves out of the target area, the controller 180 recognizes it as an occurrence of an area event, and thereby repetitively reports a measured position according to a preset report pattern (period or time) to the network server. Meanwhile, when a position trigger function is set as a periodic trigger, the controller 180 continuously measures a position using the GPS engine and then periodically executes the position report according to preset information (number of fixes, interval fixes, trigger start time).

Afterwards, when the user terminates the SUPL function, the controller 180 turns off the GPS engine and stop every process. Further, in the area event-based position report function and the periodic position report function shown in FIGS. 5A and 5B, the GPS engine may always be in an ON state as long as the user does not stop the SUPL function. In particular, even when the user is pausing at a predetermined place for a preset time while the SUPL function is activated, the controller 180 can always report to the network server a different position with an error due to a fundamental position error of the GPS system. In this instance, the GPS engine may be driven unnecessarily, causing current consumption.

Therefore, if the ON/OFF state of the GPS engine is controlled according to the user movement while the SUPL function is activated, power consumption of the mobile terminal can be significantly reduced. That is, when an area-based trigger or a periodic trigger is generated while executing a position report by a trigger function, a user movement may be sensed. Accordingly, the GPS engine can be turned on to execute the position report only when the user movement has been sensed.

Figure 6:
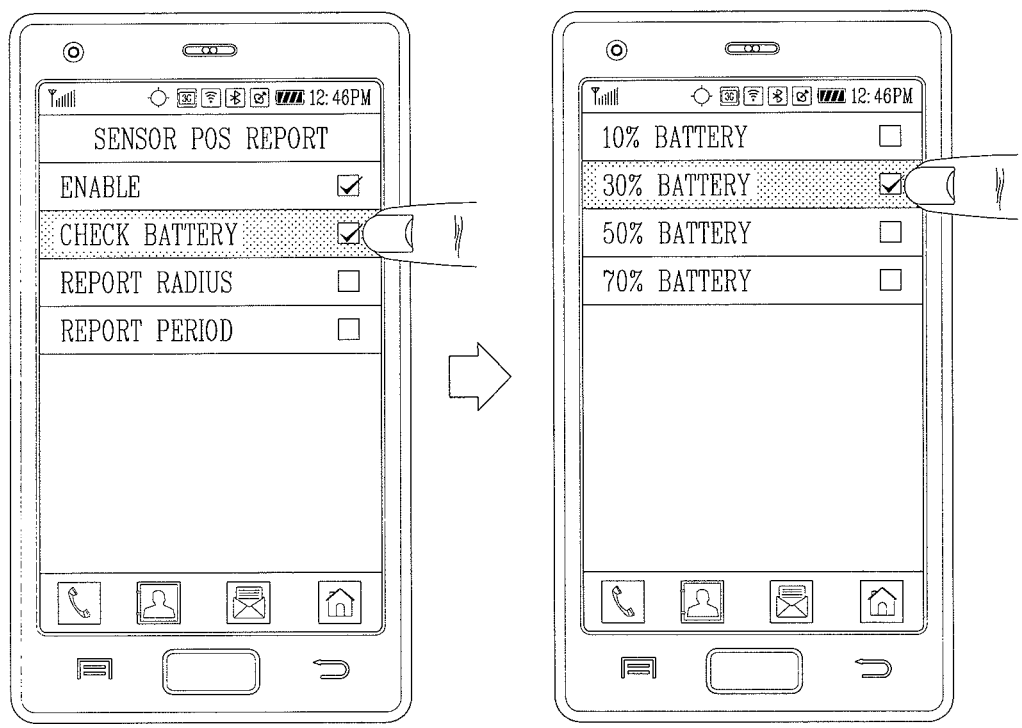
FIG. 6 is a view showing one example of a sensor position report menu for executing a position report according to a user movement when executing the position report by a trigger function.

Next, FIG. 6 is a view showing one example of a sensor position report menu for executing a position report according to a user movement when executing the position report by a trigger function. The term of the sensor position report menu is given for the sake of explanation, and corresponds to "power-saving mode" setting.

As shown in FIG. 6, when a sensor position report menu is selected from user menus, namely, when a power-saving mode is selected, the display unit 151 displays at least one selection item for executing a position report function using a sensor. The sensor position report menu may be divided into items for setting a usage condition of the position report function using the sensor and items for setting an operation condition of the GPS engine.

The items for setting the usage condition of the position report function using the sensor include an ENABLE item for selecting whether or not to use the position report function using the sensor, and a Check Battery item for automatically enabling the position report function using the sensor when a battery level is less than a predetermined level.

Also, the items for setting the operation condition of the GPS engine, which are items for setting the trigger condition, may include a Report Radius item for reporting a position only when a user enters or moves out of a predetermined radius (area), and a Report Period item for reporting a position only at a preset period.

The Report Radius item may be set by considering an error range of the GPS according to the GPS performance. It may be set differently according to a type of service providing position information. In particular, the operation condition of the GPS engine may be provided to be randomly modified by the user. The operation condition of the GPS engine may be automatically selected to reduce current consumption according to type and content of a service using position information.

Similar to the report menu, the condition of temporarily turning the GPS engine off or the threshold distance indicating the distance that the user has moved and the threshold time recognizing the occurrence of the user's movement may be applied by being randomly set by the user and calculated in a service using position information.

Figure 7:
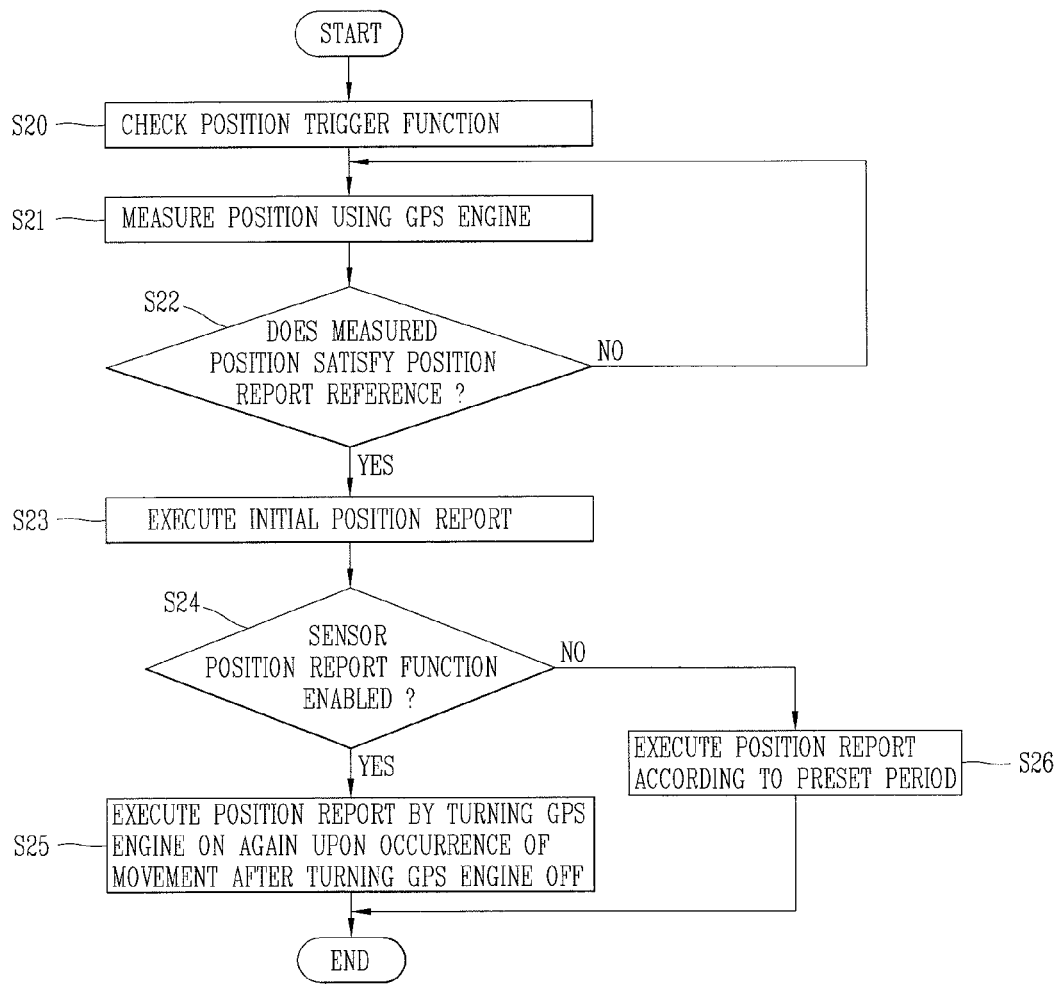
FIG. 7 is a flowchart showing a second embodiment of a GPS engine control method upon use of position information in accordance with the present disclosure.

Next, FIG. 7 is a flowchart showing a second embodiment of a GPS engine control method upon use of position information. As shown in FIG. 7, when a position measurement is initiated, the controller 180 checks whether or not a position trigger function has been enabled (S20). When the position trigger function is in the enabled state, the controller 180 checks whether the type of position trigger function is an area-based trigger or a periodic trigger, and then measure the position of the mobile terminal according to the checked type (S21).

Once the position of the mobile terminal is measured, the controller 180 checks whether or not the measured position satisfies a position report reference (trigger condition) which is required in the determined type of position trigger function (S22). When the controller 180 determines that the measured position has satisfied the position report reference (i.e., when an event is generated), for example, when an area event is generated for the area-based trigger (entering or escaping) the target area) or a preset period comes for the periodic trigger (Yes in S22), the controller 180 reports the measured position to the network server (S23).

Upon completion of the initial position report, the controller 180 executes the succeeding position report according to a set state of the sensor position report function. That is, when the initial position report is completed, the controller 180 checks whether or not the sensor position report function (power-saving mode) has been enabled (S24). The sensor position report function may be set in the sensor position report menu shown in FIG. 6.

When the sensor position report function is in the enabled state (Yes in S24), the controller 180 can sense the movement of the mobile terminal using the sensor after turning the GPS engine off. Then, only when the movement of the mobile terminal has been sensed, the controller 180 may enable the GPS engine. Then, the controller 180 measures the position of the mobile terminal and report the position to the network server (S25). Also, when the movement of the mobile terminal has not been sensed, the controller 180 may re-report a previously reported position value.

On the other hand, when the sensor position report function is not in the enabled state (No in S24), the controller 180 enables the GPS engine according to the preset period (minimal interval), as shown in the related art, execute the position measurement, and report the position to the network server (S26).

Also, when a battery level is lowered below a predetermined level while the mobile terminal 100 is operating without the sensor position report function enabled, the sensor position report function may be automatically enabled, and accordingly the position report may be executed by turning the GPS engine on/off according to the step S24. Therefore, even if the position trigger function has been set, the GPS engine may be controlled to be turned on/off according to the user movement, thereby reducing power consumption.

Figure 8:
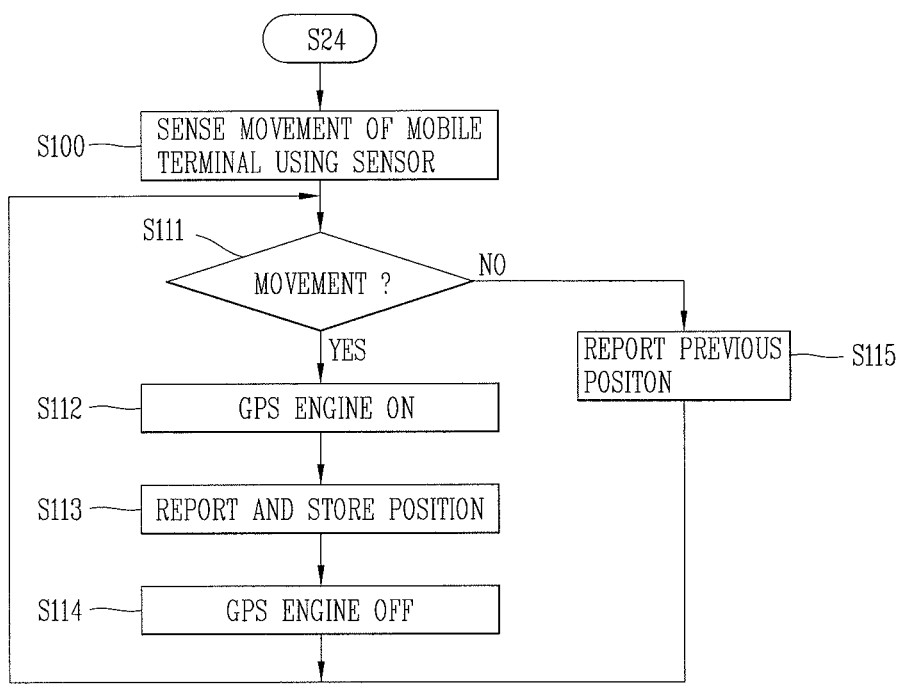
FIG. 8 is a flowchart showing an operation of executing a position report by turning on/off a GPS engine according to the user movement in FIG. 7.

FIG. 8 is a detailed flowchart showing the step S25 of FIG. 7, namely, the operation of executing the position report by turning the GPS engine on/off according to the user's movement. As shown in FIG. 8, in an enabled state of the sensor position report function (power-saving mode), the controller 180 senses at least one of speed, rotation, azimuth and gravity in association with the mobile terminal using a sensor to check whether or not the user has moved (S100, and S111).

When the controller 180 determines that the user has moved (Yes in S111), the controller 180 turns the GPS engine on (S112). The controller 180 then executes position measurement and reports and stores the position in the memory 160 (S113). After completion of the position report, the controller 180 turns the GPS engine off again (S114). On the other hand, when the controller 180 determines the user of the mobile terminal 100 has not moved (No in S111), the controller 180 re-reports a previous report position stored in the memory 160.

Next, FIG. 9 shows states of a GPS icon when the GPS engine is turned on/off. A GPS operation refers to an operation of collecting a user position. Therefore, it has to be indicated to a user in any form such that the user can be informed of the ON/OFF of the GPS engine. Accordingly, when the GPS engine is turned on or off in response to the user movement, the ON/OFF state of the GPS engine may be indicated using a GPS icon 50 which is located on an indicator area of the mobile terminal.

Thus, when the sensor is enabled, the GPS icon 50 may be displayed in a different form. In addition, the position report may be executed using the first embodiment shown in FIG. 3 as well as the second embodiment shown in FIGS. 7 and 8.

Here, when the user is pausing for a preset OFF time (threshold time) while the GPS engine is maintained in the ON state, the controller 180 can turn off the GPS engine and re-transmit a position which has been previously reported. Then, when the user movement is sensed again, the controller 180 can turn on the GPS engine and execute the position report.

As described above, in accordance with embodiments of the present invention, when a position information service is continuously provided to a user using position information, an ON/OFF state of a GPS engine is controlled in response to the user's movement, thereby minimizing current consumption. That is, the GPS engine may be temporarily turned off when the user has not moved or moves within a threshold distance while providing a position-related service, and turned on to provide the position-related service when the user keeps moving or moves over the threshold distance. This may result in reducing current consumption (power consumption) by the GPS engine.

Further, in accordance with one embodiment of the present disclosure, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of controlling a mobile terminal, the method comprising:
   receiving, via a wireless communication unit, location data from a global positioning system (GPS);
   turning on, via a controller of the mobile terminal, a GPS engine of the mobile terminal to measure a position of the mobile terminal using the location data from the GPS;
   providing, via the controller of the mobile terminal, position-related service using the position measured by the GPS engine;
   sensing, via a sensor of the mobile terminal, a movement characteristic of the mobile terminal;
   temporarily turning off the GPS engine when the sensed movement characteristic of the mobile terminal is below a predetermined threshold; and
   turning back on the GPS engine when then sense movement characteristic is greater than or equal to the predetermined threshold,
   wherein the providing the position-related service comprises:
   executing position measurement using the GPS engine according to a preset trigger type;
   checking whether or not the measured position satisfies a trigger condition; and
   executing a position report to a network server according to a preset report period when the measured position satisfies the trigger condition.

2. The method of claim 1, wherein the movement characteristic being below the predetermined threshold indicates the mobile terminal has paused from moving or is moving vertically, and the movement characteristic being greater than or equal to the predetermined threshold indicates the mobile terminal has started moving again.

3. The method of claim 1, wherein the GPS engine measures the position of the mobile terminal in a continuous or periodic manner, and
   wherein the position-related service includes applications using map information and a position report function using a secure user plane location (SUPL) function.

4. The method of claim 1, wherein when the GPS engine is temporarily turned off, the method further comprises providing the position-related service using previously measured position information.

5. The method of claim 1, wherein the predetermined threshold is set according to a user selection or automatically set according to a type of service or application.

6. The method of claim 1, wherein the sensing step only senses the movement characteristic of the mobile terminal when a power-saving mode is in an enabled state, and
   wherein the movement characteristic of the mobile terminal includes at least one of speed, rotation, azimuth and gravity with respect to the mobile terminal.

7. The method of claim 6, wherein the power-saving mode is automatically set to the enabled state when a battery level of the mobile terminal is less than a predetermined level.

8. The method of claim 1, wherein the position-related service is provided using newly measured position information after the GPS engine is turned back.

9. The method of claim 1, wherein the preset trigger type includes an area-based trigger and a periodic trigger, and the trigger condition is one of whether the measured position enters or escapes a target area or a preset time period.

10. A mobile terminal, comprising:
    a wireless communication unit configured to receive location data from a global positioning system (GPS);
    a sensor configured to sense a movement characteristic of the mobile terminal;
    a controller configured to:
    turn on a GPS engine of the mobile terminal to measure a position of the mobile terminal using the location data from the GPS and provide a position-related service using the position measured by the GPS engine,
    temporarily turn off the GPS engine when the sensed movement characteristic of the mobile terminal is below a predetermined threshold, and
    turn back on the GPS engine when then sense movement characteristic is greater than or equal to the predetermined threshold,
    wherein the controller is further configured to provide the position related service by executing position measurement using the GPS engine according to a preset trigger type, checking whether or not the measured position satisfies a trigger condition, and executing a position report to a network server according to a preset report period when the measured position satisfies the trigger condition.

11. The mobile terminal of claim 10, wherein the movement characteristic being below the predetermined threshold indicates the mobile terminal has paused from moving or is moving vertically, and the movement characteristic being greater than or equal to the predetermined threshold indicates the mobile terminal has started moving again.

12. The mobile terminal of claim 10, wherein the GPS engine measures the position of the mobile terminal in a continuous or periodic manner, and
    wherein the position-related service includes applications using map information, and a position report function using a secure user plane location (SUPL) function.

13. The mobile terminal of claim 10, wherein when the GPS engine is temporarily turned off, the controller is further configured to provide the position-related service using previously measured position information.

14. The mobile terminal of claim 10, wherein the predetermined threshold is set according to a user selection or automatically set according to a type of service or application.

15. The mobile terminal of claim 10, wherein the sensor is further configured to only sense the movement characteristic of the mobile terminal when a power-saving mode is in an enabled state, and
   wherein the movement characteristic of the mobile terminal includes at least one of speed, rotation, azimuth and gravity with respect to the mobile terminal.

16. The mobile terminal of claim 15, wherein the power-saving mode is automatically set to the enabled state when a battery level of the mobile terminal is less than a predetermined level.

17. The mobile terminal of claim 10, wherein the position-related service is provided using newly measured position information after the GPS engine is turned back.

18. The mobile terminal of claim 10, wherein the preset trigger type includes an area-based trigger and a periodic trigger, and the trigger condition is one of whether the measured position enters or escapes a target area or a preset time period.

* * * * *